United States Patent [19]
Kozlov

[11] 3,723,726
[45] Mar. 27, 1973

[54] DEVICE WITH DIAMOND DETECTOR WITH NEUTRON DETECTION

[75] Inventor: Stanislav Fedorovich Kozlov, Moscow, U.S.S.R.

[73] Assignee: Fizichesky Institut Imeni P.N. Lebedeva Akademii Nauk SSSR, Moscow, U.S.S.R.

[22] Filed: Oct. 3, 1969

[21] Appl. No.: 863,614

[30] Foreign Application Priority Data

Oct. 3, 1969 U.S.S.R. .............................. 1274217

[52] U.S. Cl. ........................... 250/83.1, 250/83.3 R
[51] Int. Cl. ............................................... G01t 3/00
[58] Field of Search ............ 250/83.1, 83.3 R; 11/11

[56] References Cited

UNITED STATES PATENTS

| | | |
|---|---|---|
| 2,760,078 | 8/1956 | Youmans ........................ 250/83.1 X |
| 2,951,942 | 9/1960 | Kramish .......................... 250/83.1 |
| 3,201,590 | 8/1965 | Sun .................................. 250/83.1 X |

*Primary Examiner*—Archie R. Borchelt
*Attorney*—Waters, Roditi & Schwartz

[57] ABSTRACT

A device for neutron detection, comprising in combination with a radiator a nuclear radiation detector on the basis of a diamond crystal plate with contacts formed at the opposite sides thereof, one of which contacts is made blocking in relation to charge carriers and is provided with said radiator, while the opposite contact is made of a material capable, in conjunction with a diamond, of injecting charge carriers under the influence of an applied electric field.

3 Claims, 2 Drawing Figures

DEVICE WITH DIAMOND DETECTOR WITH NEUTRON DETECTION

The present invention relates to devices for detection of neutrons, for instance, with the aim of neutron spectrometry or neutron flux measurement.

Widely known are devices for neutron detection, comprising neutron-sensitive means for converting neutrons into ionizing radiation, termed neutron converters or radiators, and nuclear radiation detectors on the basis of silicon, or germanium, or silicon carbide. The radiator is mounted in front of a detector which detects charged particles, resulting from nuclear reactions induced by neutrons in the radiator medium.

A limitation of devices with silicon detectors is that when detecting high-energy neutrons large background occurs as a result of neutron-induced reactions with silicon nuclei within a detector. Furthermore, these detectors cannot be used at high temperatures. Germanium detectors should be cooled during operation, although they give lower background due to neutron-induced reactions than silicon detectors. Silicon carbide detectors can operate at elevated temperatures, but they have poor energy resolution and low signal to noise ratio. In addition, all the detectors described above are sensitive to gamma-radiation background which usually accompanies neutron irradiation. These detectors have a high noise level at room temperature. In some cases the detector does not allow low-energy neutrons to be detected for their spectrometry. Finally, radiation damage by neutrons limits the service life of these detectors.

It is an object of the present invention to provide a device for neutron detection, that will be insensitive to gamma-radiation, give low background due to neutron-induced reactions and can detect neutrons with high sensitivity at room and higher temperatures.

In the accomplishment of the above and other objects of the invention, in a device for neutron detection, comprising a radiator converting neutrons into ionizing radiations, at least one nuclear radiation detector with an amplifier and means for recording output signals and a detector power supply, according to the invention, in combination with a radiator a nuclear radiation detector is used which is essentially a diamond crystal plate with contacts formed at the opposite sides thereof and designed for applying an electric field to said plate, the plate having the thickness of the operating range between said contacts not exceeding the distance travelled by charge carriers in the diamond crystal under the influence of an applied electric field, the contact disposed on the plate side adapted to be irradiated with ionizing radiation resulting from nuclear reactions induced by neutrons in the radiator medium during neutron detection being made blocking in relation to charge carriers and connected to the input of an amplifier with recording means, while the contact disposed on the opposite side of the plate is made of a material capable, in conjunction with a diamond, of injecting charge carriers under the influence of an applied electric field and connected through a resistor to a power supply.

With the use of the diamond detector having a blocking contact and an injecting contact, a radiator may be made as a film of a neutron-sensitive material capable of converting neutrons into ionizing radiations, such film being mounted in front of and close to the blocking contact of the diamond detector.

For increasing neutron detection efficiency it is advantageous to form the blocking contact integral with the radiator. In this case the blocking contact of the diamond detector may be formed by a surface layer of as carbide of neutron-sensitive material or by a surface layer of the diamond crystal plate, said layer being doped with neutron-sensitive material. This results in converting neutrons into ionizing radiation directly in the blocking contact.

In a device designed for neutron spectrometry, two diamond detectors may be used. A radiator is disposed between their blocking contacts facing each other, these contacts being connected to the same amplifying and recording means summing detector output signals.

For a better understanding of the invention, presented hereinbelow is a description of an exemplary embodiment thereof with reference to the accompanying drawings, in which.

Figure 1:
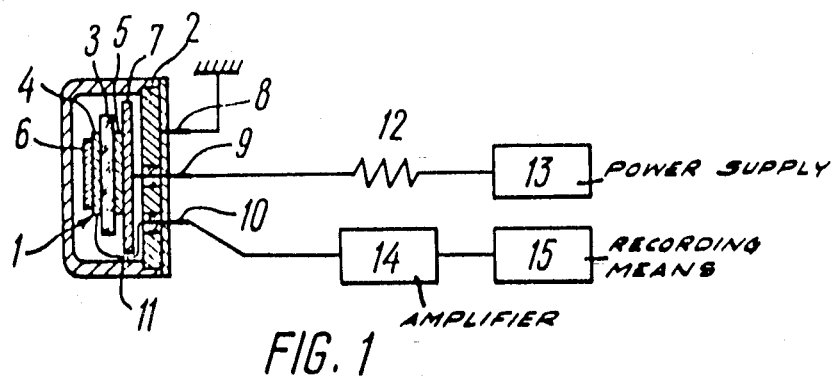
FIG. 1 is a schematic cross section through a device for neutron detection with a detector comprised of a diamond crystal plate having a blocking contact and an injecting contact.

A nuclear radiation detector 1 (FIG. 1) is mounted in a metallic housing 2 made of a weakly absorbing neutron material, such as aluminum. In some cases the housing may be non-metallic and made, for instance, of glass. The detector 1 is essentially a diamond crystal plate 3 on whose opposite sides contacts 4 and 5 are provided. The contact 4 is made blocking in relation to charge carriers and manufactured, for example, from a platinum film. The contact 5 is made of a material capable, in conjunction with a diamond, of injecting charge carriers under the influence of an applied electric field and is formed, for example, by a silver film. The thickness $d$ of the operating range of said plate 3 disposed between the contacts 4 and 5 does not exceed the distance travelled by charge carriers in the diamond crystal under the influence of an applied electric field and is given by $$d \leq \delta = \eta \tau E,$$

where $\eta$ is the mobility of charge carriers (electrons or holes), $\tau$ is the lifetime of charge carriers, $E$ is the applied field strength, $\delta$ is the distance travelled by charge carriers under the influence of the applied electric field.

A radiator 6 of neutron-sensitive material is mounted in front of and close to the blocking contact 4. Different materials are used for the radiator, depending on the energy of neutrons to be detected. For example, for thermal neutron detection radiators containing $B^{10}$ or $Li^6$ are used and the $B^{10}(N,d)Li^7$ or the $Li^6(N,d)H^3$ reactions are utilized. If neutron-induced fission is used, a radiator is provided, containing, for instance, $U^{233}$, $U^{235}$, $Pu^{239}$ for slow neutron detection and $U^{238}$, $Np^{237}$, $Pa^{232}$, $Th^{232}$ for fast neutron detection. Fast neutrons may also be detected by scattering of neutrons in the radiator of hydrogenous material, such as polyethylene, paraffin or metal hydrides. For minimizing the background flux of thermal neutrons the housing 2 is surrounded by a shield (not shown in the drawing), made, for instance, of Cd, $B^{10}$ or $Li^6$. For moderating fast neutrons the housing is shielded with $B^{10}$, $Li^6$ or hydrogenous material such as paraffin, while this shield is sometimes surrounded by another shield produced, for instance, from Cd or $B^{10}$ for eliminating the background due to thermal neutrons.

The diamond detector is connected with the neutron-sensitive radiator at the side of its blocking contact by various methods. For instance, a polyethylene film may be simply glued to the blocking contact. The radiator of $Li^6$ may be formed by evaporating a film of $Li^6F$ onto the blocking contact in vacuum. Fissile materials are applied to one side of a plate made, for instance, of aluminum and then this plate is attached to the blocking contact of the diamond detector in different possible ways, the deposited side of the plate being adjacent to the blocking contact. Along with these conventional methods, fissile materials may be directly electroplated onto the blocking contact. In some cases the blocking contact itself can serve as a radiator. For this purpose it is formed by a surface layer of a carbide of neutron-sensitive material, such as boron carbide enriched in $B^{10}$. In addition the blocking contact of the diamond detector may be formed by doping the surface layer of the diamond crystal plate with neutron-sensitive material, for instance, with boron enriched in $B^{10}$ or lithium enriched in $Li^6$. After appropriate treatment this layer can serve as both a blocking contact and a radiator at the same time.

Sometimes the housing is filled at pressures with gases used as a radiator, such as hydrogen with the impurity of heavy gases, or $BF_3$ enriched in $B^{10}$, or $He^3$. In the last case the reaction $He^3(n,p)H^3$ is utilized. If a solid radiator is used, the housing, on the contrary, is sometimes evacuated.

Said diamond detector 1 with the radiator 6 is fixed on a support 7, for instance, by means of silver paint (paste) subjected to appropriate treatment. The support 7 made of an electroconductive material is disposed on the side of the injecting contact 5. A metal lead 8 is welded to the housing 2 and used for its grounding. Additionally, the housing 2 has two metal leads 9 and 10, insulated by suitable metal-insulator seals. The lead 9 welded to the support 7 is used for applying a voltage to the diamond detector. The insulated lead 10 is joined to the blocking contact 4 of the diamond detector by a wire 11 welded to it for transmitting the detector signals. The lead 9 is associated through a resistor 12 with a power supply 13, while the lead 10 is connected to the input of an amplifier 14 with recording means 15.

Figure 2:
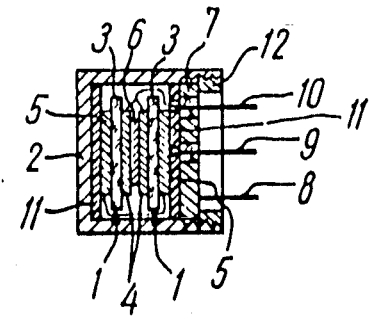
FIG. 2 is a sectional side view which shows a device for neutron detection with two detectors.

A device with two diamond detectors (FIG. 2) is designed for neutron spectrometry and neutron flux measurement. Additionally it provides for detecting neutrons within the angle of $4\pi$. This device comprises two nuclear radiation diamond detectors 1, mounted in the housing 2. The detectors are essentially diamond crystal plates 3 having blocking contacts 4 and injecting contacts 5. The blocking contact 4 of one or both detectors is provided with a radiator 6 made of a neutron-sensitive material. The detectors are arranged so that their blocking contacts, with the radiator 6 disposed between them, are in intimate contact. A metallic holder 7 is inserted in the housing. The holder has a lead 8 welded to it and two insulated leads 9 and 10. The mounting of the diamond detectors and the insulation of their injecting contacts 5 is accomplished by means of two insulating gaskets 11 and a nut 12 screwed up into the housing. There are holes in one of the gaskets for the passage of wires coupling the insulated lead 10 to said blocking contacts 4 and the lead 9 to said injecting contacts 5. The ionizing radiation resulting from neutron-induced reactions inside the radiator medium such as $Li^6F$ (tritons and alpha particles) penetrate both diamond detectors. The coincident detector pulses are amplified and summed by appropriate apparatus. The amplitude of the total signal and the energy release of the reaction being known, one can determine the energy of incident neutrons In some cases the diamond detectors are placed apart and arranged so that their blocking contacts face each other, while $He^3$ gas is used as a radiator.

The holder 7 is sometimes provided with three insulated leads, one of which is associated with the injecting contacts of the diamond detectors, while two other leads are connected to the pertinent blocking contacts. The detector signals are separately amplified with appropriate apparatus and then fed to a coincidence circuit. This allows background to be minimized.

The device described hereinabove operates in the following manner. Direct voltage is applied to the diamond detector 1 from the power supply 13. The neutrons to be detected pass through the housing 2, penetrate the radiator 6 and produce ionizing radiations therein as a result of nuclear reactions. These ionizing radiations penetrate the diamond detector 1 from the side of its blocking contact 4 and cause ionization inside the detector. The resulting charge carriers (electrons and holes) move to the contacts 4 and 5 under the influence of the applied electric field. The electrons travel to the injecting contact 5, if a positive potential is applied to it. The holes travel to the blocking contact 4. On their movement to the contact 5 some electrons are trapped by traps always present in the diamond crystal. As a result, the diamond crystal plate 3 polarizes. The injecting contact 5 is designed to remove said polarization. Since deep traps are present in the diamond, the injection currents from the contact 5 are limited by the space charge accumulated by these traps. Thus, the injection currents do not induce significant conductivity and, consequently, noise. However, when field and charge equilibrium inside the diamond crystal plate is disturbed due to polarization created by incident ionizing radiation, the charge carriers (holes) injected by the contact 5 restore the initial steady state of the crystal.

Some holes travelling to the contact 4 may also be trapped. In this case, however, the trapped holes are in the ionization zone and can be neutralized by the charge carriers of the opposite sign, i.e., by electrons. In addition, when detecting heavily ionizing nuclear radiation, losses in the electron-hole plasma are reduced, since the field strength is higher in the vicinity of the blocking contact 4.

The signal removed from the blocking contact 4 of the diamond detector 1 is fed to the input of the amplifier 14 and then to the recording means 15, such as a pulse-height analyzer.

For ensuring detection of isotropic neutron fluxes two diamond detectors for nuclear radiations may be used. Their injecting contacts are in contact, while the blocking contacts are provided with radiators.

With a view to increasing neutron detection efficiency mosaics or stacks may be composed of said diamond detectors.

For enhancing the efficiency of detection of short-range ionizing radiations, such as fission fragments, resulting from nuclear reactions induced by neutrons in the radiator medium, the blocking contact of said diamond detectors is made permeable to said ionizing radiations.

For decreasing the sensitivity to gamma-radiation background the blocking and injecting contacts of said diamond detectors are formed from materials having low atomic numbers.

Said diamond detector having the injecting contact and the blocking contact provided with the radiator may also be encapsulated in epoxy resins, silicone resins or compounds.

The present device for neutron detection has a number of advantages over the known devices. It may be used for neutron spectrometry and neutron flux measurement in critical assemblies, inside reactors and outside their protection, in neutron generators. It may also be used as a neutron monitor in various investigations. Because of usage of the diamond detector the device possesses good counting and spectrometric properties and high signal to noise ratio, operates at room and higher temperatures, has low sensitivity to gamma-radiation and negligible background due to neutron-induced reactions. Owing to its compactness, it does not distort neutron flux. Since the diamond detector withstands heating up to high temperatures, the defects caused by neutrons inside the diamond detector may be annealed from time to time. This increases radiation resistance of the device and its service life.

I claim:

1. A device with a diamond detector for neutron detection, comprising in combination: a material converting neutrons into ionizing radiation as a result of nuclear reactions therein; a diamond nuclear radiation detector comprising a diamond crystal plate having a blocking contact and an injecting contact formed at the opposite sides thereof and adapted for applying an electric field to said plate when detecting neutrons, said blocking contact being on the plate side which is irradiated and comprises a surface layer of a carbide of the neutron conversion material, whereby neutrons are converted into ionizing radiations directly in said blocking contact, and said contact being made blocking in relation to charge carriers, said injecting contact disposed on the opposite side of the plate comprising a material capable, in conjunction with said diamond crystal plate, of injecting charge carriers under the influence of said electric field, said plate having a thickness between said contacts equal to or less than the maximum drift length of the charge carriers created in the diamond crystal plate by the ionizing radiation under the influence of said electric field corresponding to the maximum drift rate; a detector power supply connected to said injecting contact; an amplifier having an input connected to said blocking contact and means for recording input signals.

2. A device according to claim 1, wherein said blocking contact of the diamond detector comprises a surface layer on the diamond crystal plate, said layer being doped with the neutron conversion material, whereby neutrons are converted into ionizing radiations directly in the blocking contact.

3. A device according to claim 1, comprising two diamond detectors, the respective blocking contacts of said two detectors facing each other with a neutron conversion material disposed therein and being connected to the same amplifying and recording means summing the detector output signals.

* * * * *